Figure 1:
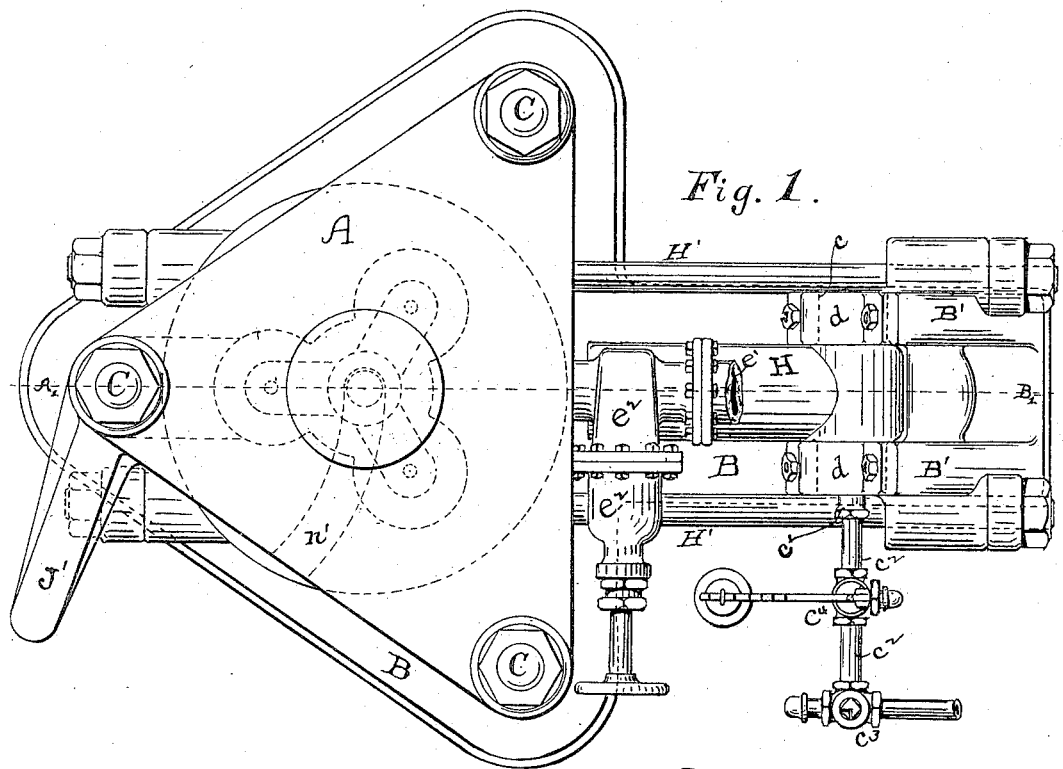

(No Model.) 2 Sheets—Sheet 1.

W. L. CHASE.
APPARATUS FOR MOLDING ARTICLES FROM PULP.

No. 298,729. Patented May 20, 1884.

Witnesses,
J. Walter Blandford
W. C. Shaffer

Inventor,
William L. Chase
by Marcellus Bailey
his attorney (No Model.) 2 Sheets—Sheet 2.
W. L. CHASE.
APPARATUS FOR MOLDING ARTICLES FROM PULP.
No. 298,729. Patented May 20, 1884.
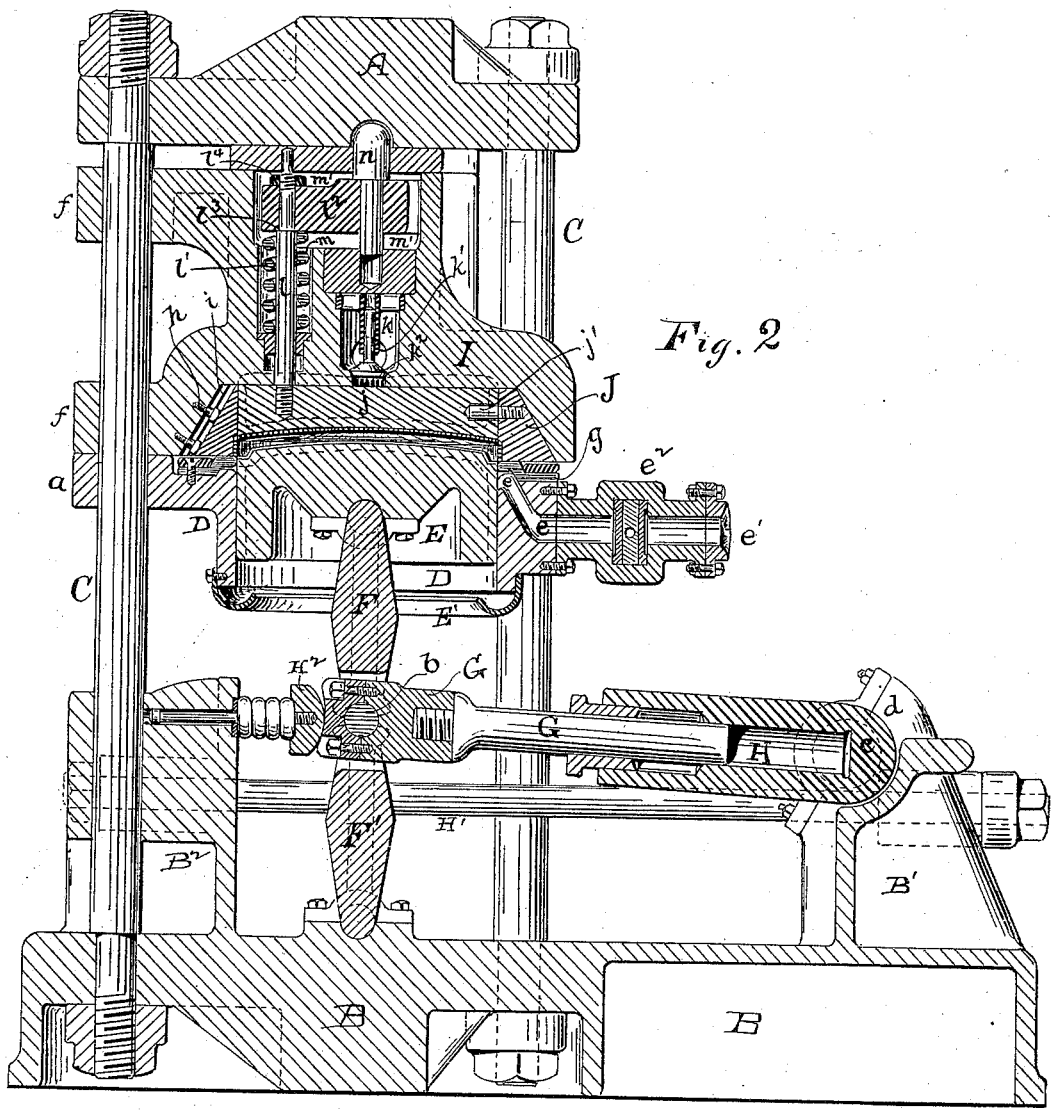

UNITED STATES PATENT OFFICE.

WILLIAM L. CHASE, OF PORTLAND, MAINE.

APPARATUS FOR MOLDING ARTICLES FROM PULP.

SPECIFICATION forming part of Letters Patent No. 298,729, dated May 20, 1884.

Application filed September 19, 1883. (No model.)

*To all whom it may concern:*

Be it known that I, WILLIAM L. CHASE, of Portland, in the county of Cumberland and State of Maine, have invented certain new and useful Improvements in Apparatus for Molding Articles from Pulp, of which the following is a specification.

My invention is directed to the rapid and economical handling of great pressure in the molding of articles from pulp, and to the removal of the molded article from the die.

The first part of the invention has relation to the means for obtaining and applying the requisite pressure, and is characterized by the combination, with the piston or plunger which co-operates with the die to mold or press the pulp article, of toggle-arms connected therewith, and a hydraulic ram connected with and adapted to operate the toggle, substantially in the manner hereinafter described.

Hydraulic pulp-molding presses, I am aware, are not new, and toggle-presses in which the toggle-arms are operated by screw or eccentric in the usual way have before been employed in the molding of pulp; but I am not aware of any press designed for molding or pressing pulp or other analogous purposes where the toggle which is connected to the piston or plunger which delivers the pressure is connected to and operated by a hydraulic ram. The toggle is perfectly adapted to molding pulp, the pressure obtained by it increasing directly as it is required to compact the hardening material. Hydraulic pressure is a most convenient and rapid means of exerting any range of power, and the combination of the two furnishes a very readily-operated and most powerful apparatus. The ram is, furthermore, readily and easily applied to the toggle, having its piston jointed to the pivot-pin of the toggle-arms, and being itself hung on trunnions or in an equivalent manner, so that it may oscillate to any extent required to keep its cylinder and piston in direct line with the pivot of the toggle.

The second part of my invention, which relates to the removal of the article from the die, is intended to obtain, at the proper time, the automatic loosening or detaching of the article from the die in which it is formed or pressed. To this end I make use of a die the hollow body of which is made with outwardly-flaring walls, and is combined with a sectional lining composed of two or more staves or sections adapted to fit together within the die, so as to present an unbroken inner surface of the shape to be imparted to the article, and movable longitudinally upon the flaring inner walls of the die, so as to spread apart when moved toward the mouth of the die; and with these parts I also combine mechanism (which may be termed "discharging mechanism") whereby simultaneous longitudinal movement is imparted to all the staves or sections. A die thus organized is not here claimed, the same having been made by me the subject of another application for Letters Patent of even date herewith. The improvement here claimed by me consists in combining with the die and the discharging mechanism a wiper or stop, or equivalent instrumentality, placed on the machine or apparatus in such position that when the die is swung back or away from the part which co-operates with it in forming or pressing the article its discharging mechanism will be brought in contact with and operated by the said wiper or stop in such manner as to cause the lengthwise movement and consequent expansion of the staves of the sectional lining, with the effect of loosening or detaching therefrom the molded pulp article. This feature is applicable not only to the special press herein shown, but also to a press of any description in which such die or dies may be used.

Figure 3:
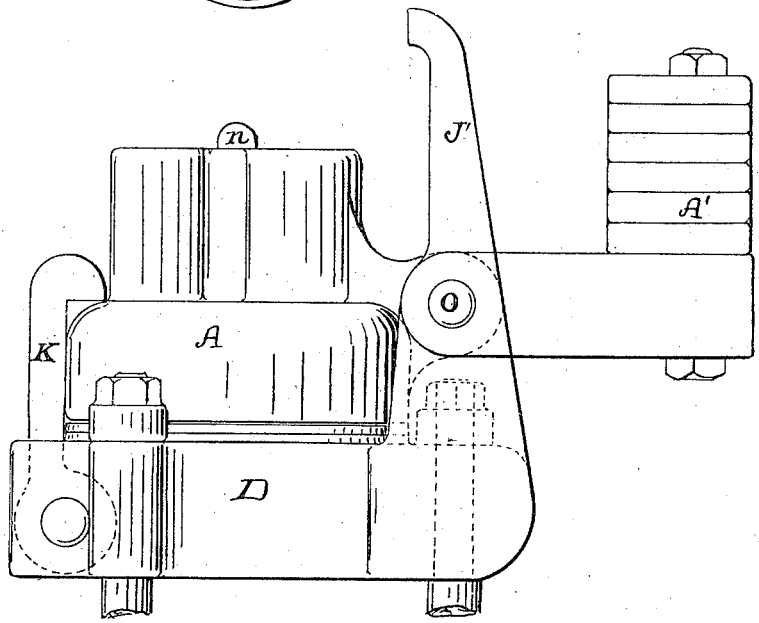

In the accompanying drawings, Figure 1 is a plan of a machine embodying my improvements, said machine being adapted more particularly for molding barrel-heads or any moderate-size articles which are approximately flat. Fig. 2 is a sectional elevation on line $A_1$ $B_1$, Fig. 1. Fig. 3 represents, in end elevation and to some extent diagrammatically, a modification adapted particularly to the molding of doors, panels, table-tops, moldings, &c.

The same letters of reference indicate corresponding parts in all the figures.

The frame of the machine in Figs. 1 and 2 consists of a cap, A, and base B, firmly bolted together by the rods C, three in number. Between the cap and the base, and secured immovably to the rods C by arms $a$, (only one of which is shown,) is a cylinder, D, in which works the piston or plunger E. The under side of the piston is fitted to receive the upper end of toggle-arm F. The other arm, F', of the toggle is fitted into a corresponding seat in the base B of the machine, and the two arms are jointed together by a pivot-pin, $b$. Fitted to the joint-pin $b$ so as to turn thereon is the head of a hydraulic piston-rod, G, the cylinder H of which is provided with trunnions $c$, resting in bearings $d$, which form a part of the base B. Hydraulic pressure is admitted to and relieved from the cylinder H through the center of one of the trunnions $c$, which is hollow, and communicates with the cylinder, and by stuffing-box $c'$ is joined to a pipe, $c^2$, leading from the pump or other forcing apparatus. Pipe $c^2$ is controlled by a three-way valve or cock, $c^3$, by which the pressure may be admitted to or relieved from the cylinder, and on the pipe is a safety or regulating valve, $c^4$, of the well-known type represented, or of any other suitable known type which may be set so as to regulate the hydraulic pressure with great nicety, thus determining with precision the amount of power to be exerted by the same upon the toggle. In order to strengthen the bearing $d$, the block B', of which they are part, is provided with ears, which are firmly bolted by horizontal rods H' to a corresponding block or projection, $B^2$, formed on the opposite end of base B and encircling the vertical rod C at that point.

Upon the inner face of block $B^2$ of the base B is fixed the spring-buffer $H^2$, which bears against the joint of the toggle-arms on the side opposite the hydraulic piston-rod, and is so proportioned in strength of resistance as to arrest the toggle rigidly at its point of greatest extension. It also acts when the hydraulic pressure is released to push the piston back in the hydraulic cylinder, and to draw down the toggle-arms and the piston or flange carried by the same far enough to bring the latter below the feed-opening $e$ in the side of cylinder D. Feed-opening $e$ is connected by means of pipe $e'$ and valve $e^2$ with a reservoir (not shown) containing fluid pulp, which is maintained by a suitable pump at any required pressure.

Above the cylinder, and just filling the space between it and the cap A, is the die I, which, by sleeves $f$, is hung on one of rods C, so that it may swing in a horizontal plane, to cover or uncover the top of the cylinder D, as desired. On the top of the cylinder is a packing-ring, $g$, with a loose inner edge, which, by pressure of the incoming pulp, is forced up against the inner edge of the die, and makes a tight joint between the die and cylinder. The die I is hollow, with outwardly-flaring walls, which are lined with a sectional shell or lining, consisting of two or more sections, J, whose interior surface, when they are fitted closely together, has the shape which is to be imparted to the molded pulp article. These sections fit together within the die, and have slanting outer faces corresponding to the flare of the walls of the die against which they rest, and to which they are held by T-headed bolts $h$ on the die, projecting into suitable undercut longitudinal slots $i$ in the sections, whereby the sections are made capable of moving longitudinally, or to and from the mouth of the die. When drawn in the die, they are in normal position and ready for molding. When moved outwardly they, by traveling on the outwardly-flaring walls of the die, are caused to expand or spread apart, thus detaching or loosening themselves from the molded article. Between the upper ends of the sections is a false bottom, $j$, which is connected to the sections by pins $j'$ on the one entering loosely sockets in the other, the false bottom being by this arrangement caused to participate in the longitudinal movement only of the sections which can spread apart or draw together independently of the false bottom. The inner faces of the sections and false bottom are grooved or channeled and communicate with passages leading to the chamber $k$ in the top of the die I, closed at its upper end, and provided with an opening, $k'$, through which the water expressed from the pulp is carried off by means of flexible tubing connected with said opening, and leading to an exhaust-pump or other exhausting device. A check-valve, $k^2$, is provided in the chamber for preventing back-flow. The grooved faces of the sections and false bottom are covered with perforated metal and fine wire-gauze, to prevent passage of particles of pulp, while allowing free passage to water. The acting face of the piston or plunger E is similarly formed, and the channels therein lead through suitable passages to the drip-spout E' on the under part of the piston. Sectional lining and false bottom are held up in place by spring action. The devices for this purpose consist of three pins, $l$, which pass loosely down through the die I, and are screwed into or otherwise made fast to the false bottom $j$. The die is formed with chambers $m$, for receiving the pin $l$ and the retractile or upholding springs $l'$, which surround them, and with an enlarged chamber or recess, $m'$, in which is a three-armed yoke, $l^2$, through whose arms the upper ends of the pins $l$ pass, the yoke resting on shoulders $l^3$ on the pin, and being held firmly down thereon by nuts $l^4$ on the projecting upper ends of the pins. A central pin, $n$, secured to the yoke, and projecting loosely through an aperture in the top of the die, is employed as a means of depressing the yoke, and consequently the pins $l$ and parts connected to same, against the stress of the spring $l'$. The projecting head of the discharging-pin $n$ works in a groove, $n'$, in the cap A, curved in the arc of a circle of which the axis C, on which the die swings, is the center.

As hereinbefore stated, I do not here claim a die of the general construction thus far described, the same having been made by me the subject of a separate application for Letters Patent of even date herewith. What I here desire to claim, besides the special arrangement of the spring retracting and discharging mechanism connected with the sectional lining, is the combination of the same, or any equivalent for the purpose, with a stop or wiper on the machine, whereby, when the die is swung or moved back from over the cylinder or other part with which it may co-operate, the discharging mechanism will be automatically operated to move the lining in the direction needed to cause its sections to spread apart, and thus loosen or detach from the die the molded article. In the machine shown in the drawings I make provision for this by placing a stop or wiper-arm, J', on the machine in such position that when the die is swung away from over the cylinder the rounded projecting upper end of the discharging-pin $n$ will strike the said wiper-arm, and will be depressed thereby against the stress of the retracting-springs. The depression of the pin causes a corresponding depression of the yoke to which it is attached, and the latter forces down the pins $l$, thus imparting to the sectional lining the longitudinal movement requisite to spread apart its sections. As soon as the die is swung back away from the wiper, the pin $n$ is released, and the retracting-springs at once draw up and return the sectional lining to its normal position.

In the modification shown in Fig. 3 the die A is hung on a horizontal axis or hinge, $o$, instead of on a vertical axis, as in Figs. 1 and 2. In this arrangement the stop or wiper-arm is located at J', and is so placed that when the die is lifted and swung back on its hinge the head of pin $n$ will strike against said arm. The die in this arrangement is preferably counterweighted, as seen at A', and when lowered upon the cylinder D is locked down in place thereon by latches K, or their equivalent for the purpose. Other arrangements for automatically operating the discharging mechanism can be employed. One arrangement for the purpose is illustrated in the application for Letters Patent hereinbefore referred to, and others will readily suggest themselves to the skilled mechanic.

The operation of the machine in Figs. 1 and 2 is as follows: The piston or plunger E being lowered by drawing back the toggle-arms, valve $e^2$ is opened, thus admitting to the mold-chamber formed by die I and piston E fluid pulp under pressure. The valve is permitted to remain open until by the escape of water through the channels in the piston and die a sufficient quantity of pulp has been compacted into the mold to give the desired thickness to the article, which is to be determined by trial. The valve is then closed and hydraulic pressure is admitted to the cylinder H of the ram, the hydraulic piston-rod G is pushed forward, and the toggle thereby is straightened, and causes the piston E to rise and give the requisite finishing pressure to the article in the mold. Cylinder H is now relieved of pressure, which permits the compressed spring-buffer $H^2$, by its expansion or recoil, to push back the toggle-head, thus lowering the piston E. The die is now swung out on its axis until the disengaging-pin $n$ meets and is depressed by the wiper-arm J', the result of which is to discharge or kick out the molded article from the die, after which the die can be swung back, and the operation can be repeated.

It will of course be understood that the machine hereinbefore described is also adapted to be used with dies constructed differently from the special die herein shown.

Having now described my improvements and one way of carrying the same into practical effect, what I claim herein as new and of my own invention is—

1. In a machine for molding articles from pulp, the combination, with the piston or plunger for delivering pressure upon the article, of toggle-arms and a hydraulic ram, these elements being arranged and adapted to co-operate substantially in the manner and for the purposes hereinbefore set forth.

2. The combination, substantially as hereinbefore set forth, of the pressure-delivering piston or plunger, the toggle-arms, the hydraulic ram, and the spring-buffer.

3. The hydraulic ram provided with safety-valve for regulating pressure in the hydraulic cylinder, in combination with the toggle-arms and pressure-delivering piston or plunger, substantially as hereinbefore set forth.

4. The combination of the pressure-delivering piston or plunger, the toggle-arms, and the hydraulic ram hung so as to be capable of oscillatory movement, substantially as and for the purposes set forth.

5. The die provided with a sectional lining, substantially as hereinbefore described, and movable to and from the cylinder or other part with which it co-operates in forming the pulp article, in combination with mechanism whereby the sectional lining, when moved away from said cylinder or other co-operating part, is caused automatically to expand or spread apart for the purpose of loosening or detaching the molded article, substantially as hereinbefore set forth.

6. The combination, with the die and sectional lining therefor, of the upholding-pins and their retracting-springs, the depressible yoke to which said pins are attached, and the discharging-pin, substantially as hereinbefore set forth.

7. The die provided with sectional lining and hinge, or pivoted to the machine-frame so as to swing toward and away from the part with which it co-operates in the operation of forming the article, in combination with the upholding-pins and their retracting-springs, the depressible yoke attached to said springs, the discharging-pin, and a wiper or stop to co-operate with said discharging-pin, substantially as and for the purposes set forth.

In testimony whereof I have hereunto set my hand this 18th day of September, A. D. 1883.

WM. L. CHASE.

Witnesses:
EWELL A. DICK,
J. WALTER BLANDFORD.